(12) United States Patent
Yamaura

(10) Patent No.: US 10,103,389 B2
(45) Date of Patent: Oct. 16, 2018

(54) OXIDATION GAS DISCHARGING STRUCTURE

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 378 days.

(21) Appl. No.: 14/870,840

(22) Filed: Sep. 30, 2015

(65) Prior Publication Data

US 2016/0111748 A1  Apr. 21, 2016

(30) Foreign Application Priority Data

Oct. 15, 2014  (JP) ................................ 2014-210956

(51) Int. Cl.

| | | |
|---|---|---|
| *H01M 8/02* | (2016.01) | |
| *H01M 8/0247* | (2016.01) | |
| *H01M 8/0206* | (2016.01) | |
| *H01M 8/0252* | (2016.01) | |
| *H01M 8/0258* | (2016.01) | |
| *H01M 8/2465* | (2016.01) | |
| *H01M 8/04291* | (2016.01) | |

(52) U.S. Cl.
CPC ....... *H01M 8/0247* (2013.01); *H01M 8/0206* (2013.01); *H01M 8/0252* (2013.01); *H01M 8/0258* (2013.01); *H01M 8/04291* (2013.01); *H01M 8/2465* (2013.01)

(58) Field of Classification Search
CPC ............. H01M 8/0206; H01M 8/0247; H01M 8/0252; H01M 8/0258; H01M 8/04291
USPC ...................................... 429/90, 457
See application file for complete search history.

(56) References Cited

U.S. PATENT DOCUMENTS

| | | | |
|---|---|---|---|
| 8,505,672 B2 * | 8/2013 | Schulze | ................... B60K 1/04 180/309 |
| 2012/0088175 A1 * | 4/2012 | Oriol | ...................... F28D 15/00 429/435 |
| 2013/0202979 A1 * | 8/2013 | Katano | ............. H01M 8/04761 429/444 |

FOREIGN PATENT DOCUMENTS

JP  2011-222203  11/2011

\* cited by examiner

*Primary Examiner* — Basia A Ridley
*Assistant Examiner* — James M Erwin
(74) *Attorney, Agent, or Firm* — Greenblum & Bernstein, P.L.C.

(57) ABSTRACT

An oxidation gas discharging structure is applied to a fuel cell stack that includes an end plate arranged on an end of a fuel cell body. The oxidation gas inside the fuel cell body is discharged to the outside through a through hole extending through the end plate. A slope is formed on the bottom face of the through hole to rise toward the downstream side. The slope restricts condensed water from moving downstream.

3 Claims, 3 Drawing Sheets

OXIDATION GAS DISCHARGING STRUCTURE

BACKGROUND OF THE INVENTION

The present invention relates to an oxidation gas discharging structure. The discharging structure is applied to a fuel cell stack, which includes an end plate arranged at an end of a fuel cell body and discharges oxidation gas inside the fuel cell body to the outside through a through hole, which extends through the end plate.

This type of fuel cell system includes a fuel cell stack, which includes a fuel cell body formed by stacking a plurality of cells and two end plates holding the fuel cell body from the sides in the stacking direction of the cells. For example, refer to Japanese Laid-Open Patent Publication No. 2011-222203.

A fuel cell stack disclosed in this document includes supply passages, which supply the fuel cell body with fuel gas (e.g., hydrogen), oxidation gas (e.g., air), and coolant, respectively. The fuel cell stack also includes discharge passages, which discharge the fuel gas, the oxidation gas, and the coolant from the fuel cell body, respectively.

A conventional fuel cell system includes a compressor and the like, which are arranged upstream of the oxidation gas supply passage and feed oxidation gas to the fuel cell stack. A first end plate includes a through hole that forms a part of the oxidation gas discharge passage. A connection pipe is connected to the through hole, and a sealing valve is arranged downstream of the connection pipe. The driving of the compressor is controlled to adjust the supply flow rate of oxidation gas and to adjust the open/closed state of the sealing valve, thereby controlling the pressure of oxidation gas that flows inside the fuel cell stack.

When the operation of the fuel cell system is stopped, supply of oxidation gas is stopped. At this time, the ambient air may flow into the interior of the fuel cell body through the oxidation gas discharge passage. When the ambient air flows into the fuel cell body, electrochemical reaction continues with oxygen contained in the ambient air and the fuel gas remaining inside the fuel cell body after the operation is stopped. Thus, in the conventional device, the sealing valve is closed after operation of the fuel cell system is stopped to prevent ambient air from flowing into the interior of the fuel cell body.

For example, when the ambient air temperature decreases below freezing after the operation of the fuel cell system is stopped, the following problems may occur. When the temperature of the fuel cell stack decreases along with the decrease of the ambient air temperature, water vapor that is present in the oxidation gas discharge passage is condensed to become condensed water and moves toward the outside through the discharge passage. However, since the sealing valve is closed after operation stop of the fuel cell system as described above, the condensed water is accumulated in the sealing valve. When the temperature of the condensed water decreases below freezing, the condensed water is frozen and adheres to the sealing valve.

SUMMARY OF THE INVENTION

It is an objective of the present invention to provide an oxidation gas discharging structure that restrains frozen condensed water from binding the sealing valve even if the ambient air temperature becomes below freezing.

To achieve the above objective, an oxidation gas discharging structure is applied to a fuel cell stack that includes an end plate arranged at an end of a fuel cell body. The discharging structure discharges oxidation gas inside the fuel cell body to the outside through a through hole, which extends through the end plate. The oxidation gas discharging structure includes a restriction portion that is arranged on the bottom face of the through hole in the end plate and restricts condensed water inside the fuel cell stack from moving downstream.

According to this configuration, the restriction portion restricts the condensed water in the through hole from moving downstream. This reduces accumulation of the condensed water in the sealing valve arranged downstream of the through hole.

DETAILED DESCRIPTION OF THE PREFERRED EMBODIMENTS

An oxidation gas discharging structure according to one embodiment will now be described with reference to FIG. 1. The up-down direction of FIG. 1 corresponds to the up-down direction in the vertical direction.

Figure 1:
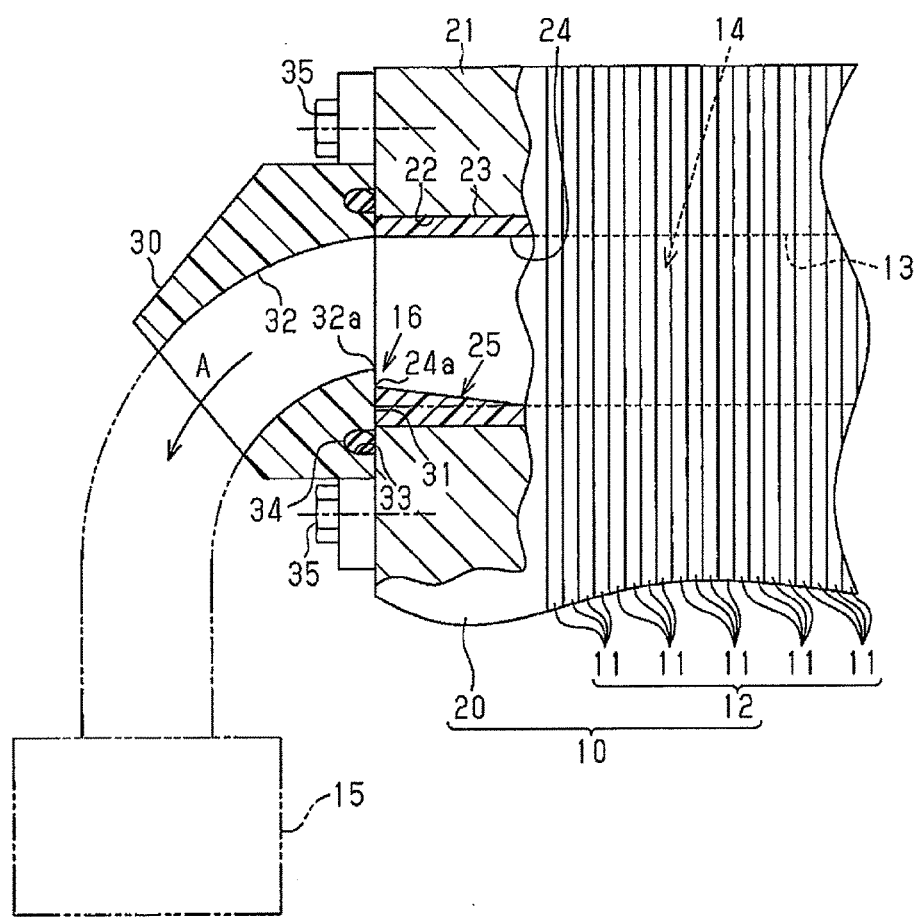
FIG. 1 is a cross-sectional view of an oxidation gas discharging structure according to one embodiment.

As shown in FIG. 1, a polymer electrolyte fuel cell is mounted on a vehicle. The fuel cell includes a fuel cell stack 10. The fuel cell stack 10 includes a fuel cell body 12, which is formed by stacking a plurality of cells 11, and two end plates 20, which hold the fuel cell body 12 from the sides in the stacking direction of the cells 11. Each of the end plates 20 is fastened to the fuel cell body 12 with a fastening member (not shown). FIG. 1 shows only one of the end plates 20 arranged on a first end of the fuel cell body 12. The oxidation gas discharging structure will now be described while focusing on the end plate 20. In the present embodiment, air is used as oxidation gas.

The fuel cell stack 10 includes a discharge passage 14, through which the oxidation gas inside the fuel cell body 12 is discharged toward the outside. The discharge passage 14 is formed by a communication hole 13, which is formed in the cells 11 of the fuel cell body 12, a through hole 24, which extends through the end plate 20, and a connection pipe 30. Hereinafter, the upstream side and the downstream side in the flowing direction A of oxidation gas in the discharge passage 14 are referred to as simply an upstream side and a downstream side, respectively.

The end plate 20 has a plate-shaped plate body 21, which is made of aluminum. The plate body 21 includes a hole 22 extending through the plate body 21 in the thickness direction. A tubular portion 23 made of hard plastic is formed inside the hole 22 of the plate body 21 and integrated with the hole 22 by insert molding. Thus, the outer circumference face of the tubular portion 23 is in contact with the inner circumference face of the hole 22 in the plate body 21. The inner space of the tubular portion 23 forms the through hole 24, and the through hole 24 forms a part of the discharge passage 14.

A slope 25 that rises toward the downstream side is formed on the bottom face of the through hole 24. The slope 25 extends across the end plate 20 in the thickness direction. The slope 25 functions as a restriction portion that restricts condensed water inside the fuel cell body 12 from moving downstream.

The connection pipe 30, which is made of hard plastic, is coupled to the downstream side of the through hole 24. The connection pipe 30 has an inside passage 32, which has a substantially rectangular cross-section. The inside passage 32 extends downward toward the downstream side. The upstream end face 31 of the connection pipe 30 includes an annular groove 33, which is shaped to surround the inside passage 32. An O ring 34 fits to the annular groove 33. The connection pipe 30 is fixed to the plate body 21 with bolts 35 while the end face 31 of the connection pipe 30 is in contact with the outside face of the plate body 21.

In the present embodiment, the lower edge 32a of the inside passage 32, which is open to the upstream end face 31 of the connection pipe 30, is located above the lower edge 24a of the through hole 24, which is open to the outside face of the end plate 20. Thus, the bottom face of the through hole 24 and the upstream end face 31 of the connection pipe 30 form a step 16 that rises toward the downstream side.

A sealing valve 15 is arranged downstream of the connection pipe 30 and is capable of opening and closing the discharge passage 14. The sealing valve 15 is, for example, an electric type. The sealing valve 15 is closed after operation stop of the fuel cell system to prevent ambient air from flowing into the interior of the fuel cell body 12 through the discharge passage 14.

Operation of the present embodiment will now be described.

Water vapor, which is present in the discharge passage 14, is condensed to become condensed water when the temperature of the fuel cell stack 10 decreases after operation stop of the fuel cell system. The condensed water then moves downstream through the discharge passage 14. At this time, the slope 25 restricts the condensed water in the through hole 24 from moving downstream. In addition, the rising step 16, which is formed on the boundary between the end plate 20 and the connection pipe 30, restricts the condensed water from passing over the end plate 20 and moving downstream. For these reasons, accumulation of the condensed water in the sealing valve 15 is properly reduced. Thus, even if the ambient air temperature becomes below freezing, the frozen condensed water is restrained from adhering to the sealing valve 15.

The above-illustrated oxidation gas discharging structure according to the present embodiment achieves the following advantages.

(1) The restriction portion is formed on the bottom face of the through hole 24 in the end plate 20 to restrict the condensed water from moving downstream. In particular, the restriction portion is the slope 25, which rises toward the downstream side.

According to such a structure, the slope 25 restricts the condensed water in the through hole 24 from moving downstream. This reduces accumulation of the condensed water in the sealing valve 15, which is arranged downstream of the through hole 24. Accordingly, the frozen condensed water is restrained from adhering to the sealing valve 15 even if the ambient air temperature becomes below freezing.

Moreover, the structure of the end plate 20 is simplified since the restriction portion is formed by the slope 25. This facilitates formation of the end plate 20.

(2) The connection pipe 30 is coupled to the downstream side of the through hole 24, and the bottom face of the through hole 24 and the upstream end face 31 of the connection pipe 30 form the step 16, which rises toward the downstream side.

According to such a structure, the rising step 16, which is formed on the boundary between the end plate 20 and the connection pipe 30, restricts the condensed water from passing over the end plate 20 and moving downstream. This further reduces accumulation of the condensed water in the sealing valve 15.

(3) The end plate 20 includes the plate body 21 and the tubular portion 23. The plate body 21 is made of aluminum and has the hole 22. The tubular portion 23 is made of plastic and integrated with the interior of the hole 22. The inner space of the tubular portion 23 forms the through hole 24.

According to such a structure, the tubular portion 23 is in contact with the plate body 21 and is made of aluminum, of which the heat capacity is smaller than that of the tubular portion 23. Thus, after operation stop of the fuel cell system, heat of the tubular portion 23 is easily transferred to the plate body 21 to facilitate decrease in the temperature of the tubular portion 23. This promotes condensation of water vapor inside the tubular portion 23, i.e., the through hole 24. Thus, the water vapor is restrained from condensing after moving downstream of the through hole 24. Accordingly, the slope 25 and the step 16 increase the amount of the condensed water restricted from moving downstream. This further reduces accumulation of the condensed water in the sealing valve 15.

The above-illustrated embodiment may be modified in the following forms.

The rising step 16 may be omitted.

Figure 2:
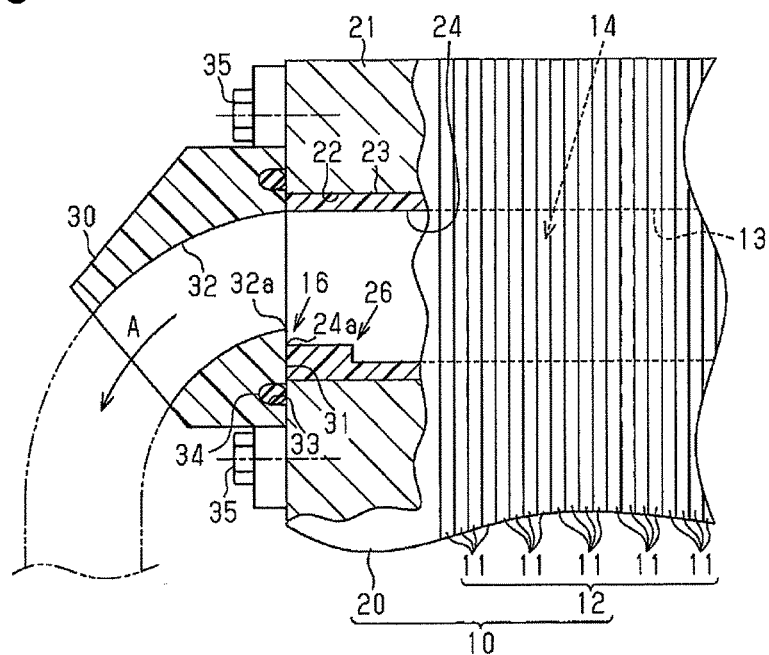
FIG. 2 is a cross-sectional view of an oxidation gas discharging structure according to a first modification.
Figure 3:
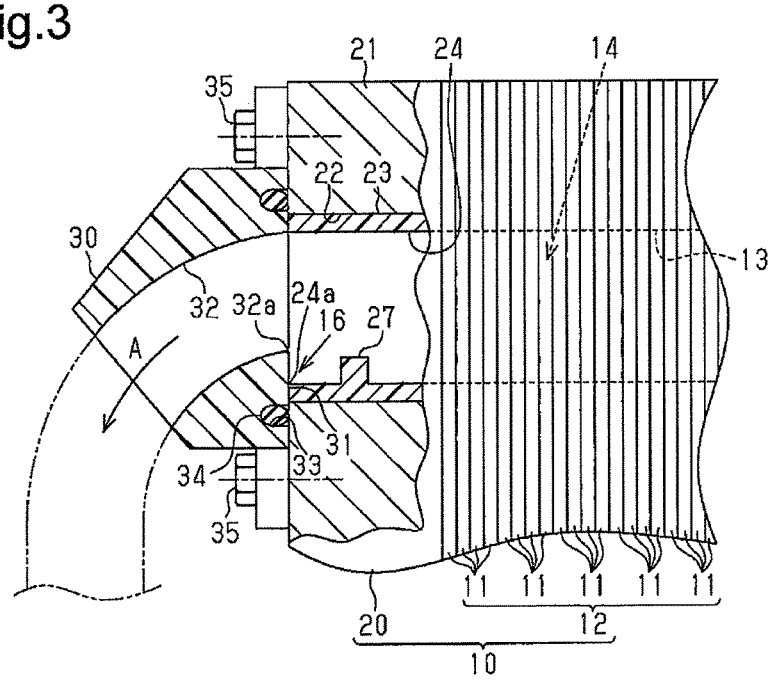
FIG. 3 is a cross-sectional view of an oxidation gas discharging structure according to a second modification.

As in a first modification shown in FIG. 2, a step 26 may be formed on the bottom face of the through hole 24 to rise toward the downstream side. As in a second modification shown in FIG. 3, a projection 27 may be formed on the bottom face of the through hole 24. Even in these cases, the step 26 and the projection 27 restrict the condensed water from moving downstream, thereby achieving an advantage similar to the advantage (1) of the above-illustrated embodiment.

Figure 4:
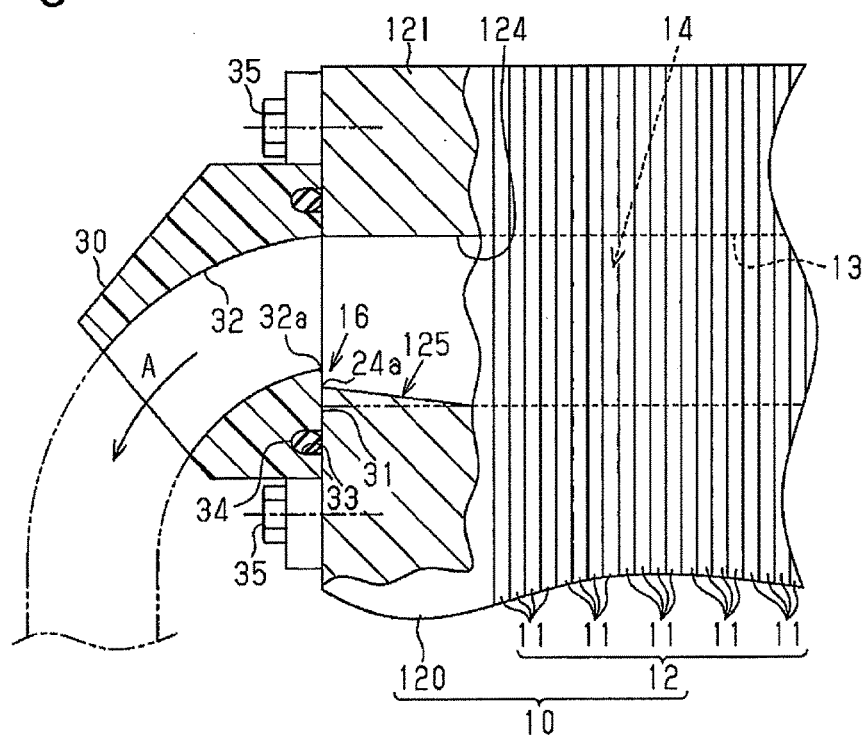
FIG. 4 is a cross-sectional view of an oxidation gas discharging structure according to a third modification.

As in a third modification shown in FIG. 4, the tubular portion made of hard plastic may be omitted, and a slope 125 as a restriction portion may be formed on the bottom face of the through hole 124, which extends through the plate body 121 of the end plate 120. In particular, the inner wall of the through hole 124 may be made of a metallic material such as aluminum. In this case, since the inner wall of the through hole 124 is made of the metallic material, which has a smaller heat capacity than plastic, the temperature of the inner wall of the through hole 124 easily decreases after operation stop of the fuel cell system. This promotes condensation of water vapor inside the through hole 124, and the water vapor is restrained from condensing after moving downstream of the through hole 124. Accordingly, the third modification achieves an advantage similar to the advantage (3) of the above-illustrated embodiment.

The invention claimed is:

1. An oxidation gas discharging structure for discharging oxidation gas inside a fuel cell body to the outside, comprising:
    a fuel cell stack that includes the fuel cell body having an end and an end plate arranged in the end of the fuel cell body, wherein the end plate includes a through hole; and a restriction portion that is arranged on the bottom face of the through hole in the end plate and restricts condensed water inside the fuel cell stack from moving downstream of the end plate, wherein:

a connection pipe is coupled to the downstream side of the through hole, and the bottom face of the through hole and an end face of the connection pipe configure a step that rises toward the downstream side.

2. The oxidation gas discharging structure according to claim 1, wherein the restriction portion is a slope that rises toward the downstream side.

3. The oxidation gas discharging structure according to claim 1, wherein:

the end plate has a plate body and a tubular portion,
the plate body is made of aluminum and has a hole, and
the tubular portion is made of plastic and integrated with an interior of the hole of the plate body.

* * * * *